United States Patent
Fujii et al.

(10) Patent No.: US 6,788,878 B1
(45) Date of Patent: Sep. 7, 2004

(54) REPRODUCING APPARATUS (75) Inventors: Akio Fujii, Yokohama (JP); Toshihiko Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,826

(22) Filed: May 23, 2000

(30) Foreign Application Priority Data

May 28, 1999 (JP) .......................... 11-150025
Jun. 15, 1999 (JP) .......................... 11-168933

(51) Int. Cl.$^7$ .......................... H04N 5/91; H04N 5/85; H04N 7/26
(52) U.S. Cl. .......................... 386/68; 386/125; 386/109
(58) Field of Search .......................... 386/46, 109, 111, 386/112, 27, 33, 124, 125, 126, 45, 40, 68, 67, 69, 70, 82, 6, 107, 117; H04N 5/91, 5/85, 7/26

(56) References Cited

U.S. PATENT DOCUMENTS 5,768,470 A * 6/1998 Muto .......................... 386/111
6,611,653 B1 * 8/2003 Kim et al. .......................... 386/68

FOREIGN PATENT DOCUMENTS

JP 62263787 A * 11/1987 .......... H04N/5/783
JP 05316460 A * 11/1993 .......... H04N/5/782

* cited by examiner

*Primary Examiner*—Robert Chevalier
(74) *Attorney, Agent, or Firm*—Robin, Blecker & Daley (57) ABSTRACT

A reproducing apparatus is arranged to reproduce from a recording medium a data string including image data and motion data indicative of motion of an image related to the image data, and to control the speed of reproduction of the image data according to the motion data included in the data string reproduced.

18 Claims, 10 Drawing Sheets

REPRODUCING APPARATUS

BACKGROUND OF THE INVENTION

1. Field of the Invention

The present invention relates to a reproducing apparatus.

2. Description of Related Art

Some of known recording-and-reproducing apparatuses are arranged to record moving image data, as digital data, on a recording medium such as a tape or a disk. The apparatus of this kind generally digitizes an image signal, transforms the digital data from a two-dimensional spatial form into a two-dimensional frequency axis form by carrying out DCT (discrete cosine orthogonal transform) or the like, quantizes the transformed data, performs a variable length coding process on the quantized data, performs, on the coded data, further processes necessary for recording, such as an error correcting process, and then records the processed data on a recording medium, such as a disk, a tape or the like.

In reproducing the record of moving image data, reproduced data read out from the recording medium, such as a disk, is subjected to an error correction process and a variable length code decoding process. The decoded data is inversely quantized. The inversely-quantized data is subjected to an inverse DCT process to obtain image data decoded on two-dimensional spatial axes. The image data thus obtained is displayed on a TV monitor, a liquid crystal display monitor or the like.

The capacity of recording media, particularly, disk-shaped media, has rapidly come to increase these days. As a result, apparatuses have come to be capable of recording and reproducing not only audio signals but also video signals over a long period of time. For example, a recording format based on a high efficiency coding process, such as MPEG, is considered to be used for an image recording-and-reproducing apparatus capable of recording images for at least one hour at a data compressing rate of 4 Mbps to 10 Mbps or thereabout. The disk-shaped media are trending to have smaller size and a larger capacity. In view of this trend, image recording-and-reproducing apparatuses are being arranged to further increase the density of recording.

Some known image recording-and-reproducing apparatuses now use the MPEG coding system or the like.

It is conceivable that, in viewing moving images recorded on a recording medium, a search reproduction is made to find beforehand what is recorded on the recording medium. In making a search for some moving image data recorded on a disk-shaped medium, reproduction is made by deciding a feeding amount of tracks of the recording medium according to a set reproduction speed which is, for example, set by the user. The images reproduced are displayed on a TV monitor, a liquid crystal display monitor or the like, and are viewed by the user.

However, in the case of the apparatus arranged as mentioned above, during the search, the reproduction is made with the feeding amount of tracks of the recording medium decided according to the set reproduction speed, irrespective of motions of images or changes of scenes.

Therefore, in cases where there are fast motions of images or much changes of scenes, it is difficult to grasp the contents of the recorded image because of insufficient correlation between scenes or because of excessively fast changes of scenes on display. Further, in the cases of images which little move and scenes which little change, on the other hand, pictures on display do not change, thereby causing the user to feel that the search is taking an unnecessarily long waiting time before finding the contents of the image recorded on the recording medium.

BRIEF SUMMARY OF THE INVENTION

The invention is directed to the solution of the above-stated problem.

It is, therefore, an object of the invention to provide a reproducing apparatus which is arranged to be capable of reproducing an image at an appropriate reproduction speed according to the motions of images obtained at the time of reproduction made for a search or the like.

It is another object of the invention to provide a reproducing apparatus arranged to be capable of performing a special reproduction, such as reproduction for a search (search reproduction), at such an appropriate reproduction speed as to make the contents of a reproduced image easily graspable.

To attain the above objects, in accordance with an aspect of the invention, there is provided a reproducing apparatus, which comprises reproducing means for reproducing from a recording medium a data string including image data and motion data indicative of motion of an image related to the image data, and control means for controlling a speed of reproduction of the image data by the reproducing means according to the motion data included in the data string reproduced by the reproducing means.

These and other objects and features of the invention will become apparent from the following detailed description of preferred embodiments thereof taken in connection with the accompanying drawings.

BRIEF DESCRIPTION OF THE SEVERAL VIEWS OF DRAWING

FIGS. 3(*a*) and 3(*b*) are timing charts for explaining the temporal sequence of images picked by the recording-and-reproducing apparatus.

FIGS. 8(*a*) to 8(*c*) are timing charts for explaining how a searching image is displayed by the reproduction system according to the third embodiment of the invention.

FIGS. 10(*a*) to 10(*c*) are timing charts for explaining how a searching image is displayed by the reproduction system according to the fourth embodiment of the invention.

DETAILED DESCRIPTION OF THE INVENTION

Hereinafter, preferred embodiments of the invention will be described in detail with reference to the drawings.

(First Embodiment)

Figure 1:
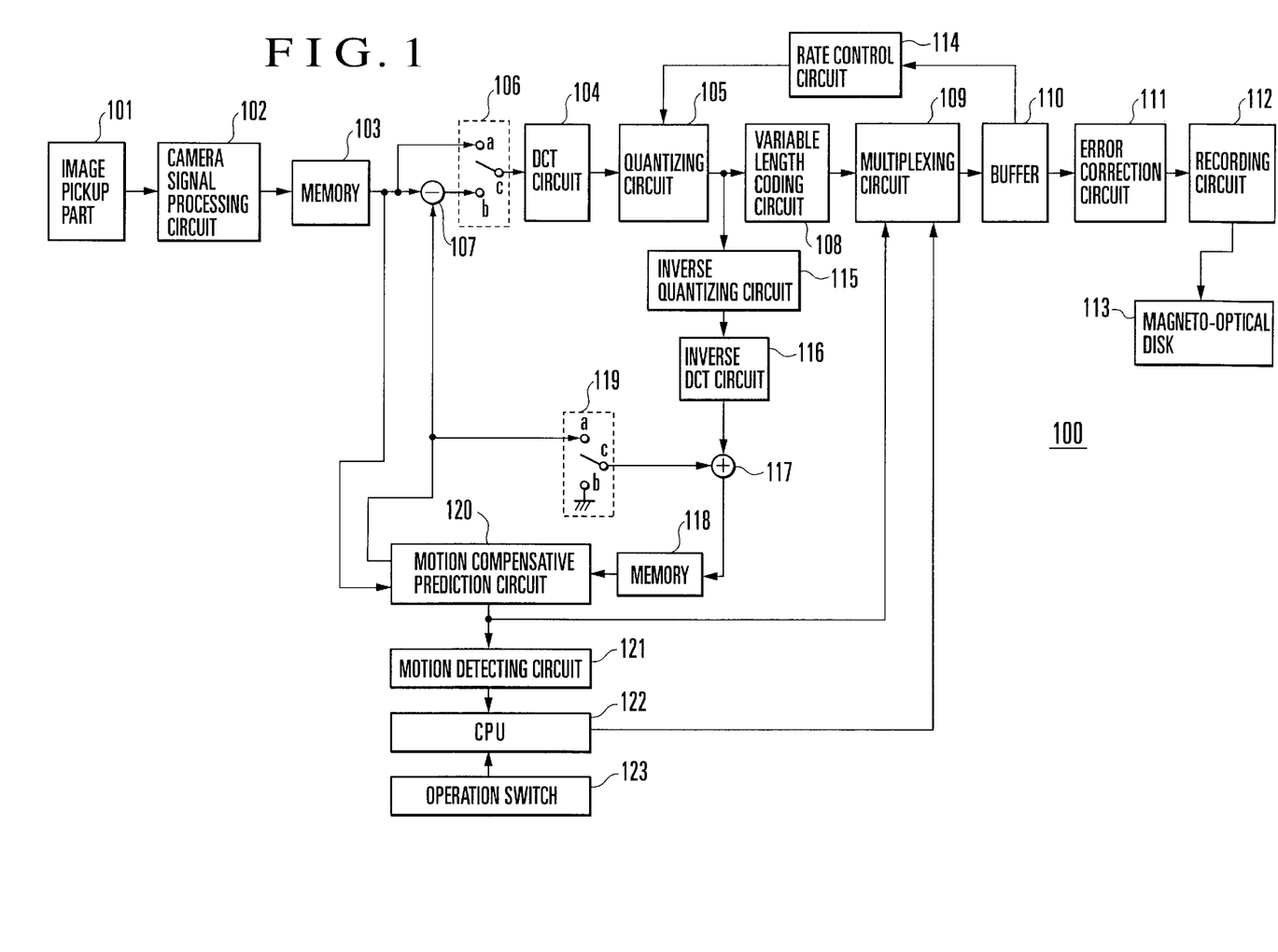
FIG. 1 is a block diagram showing the arrangement of a recording system of a recording-and-reproducing apparatus according to a first embodiment of the invention.
Figure 2:
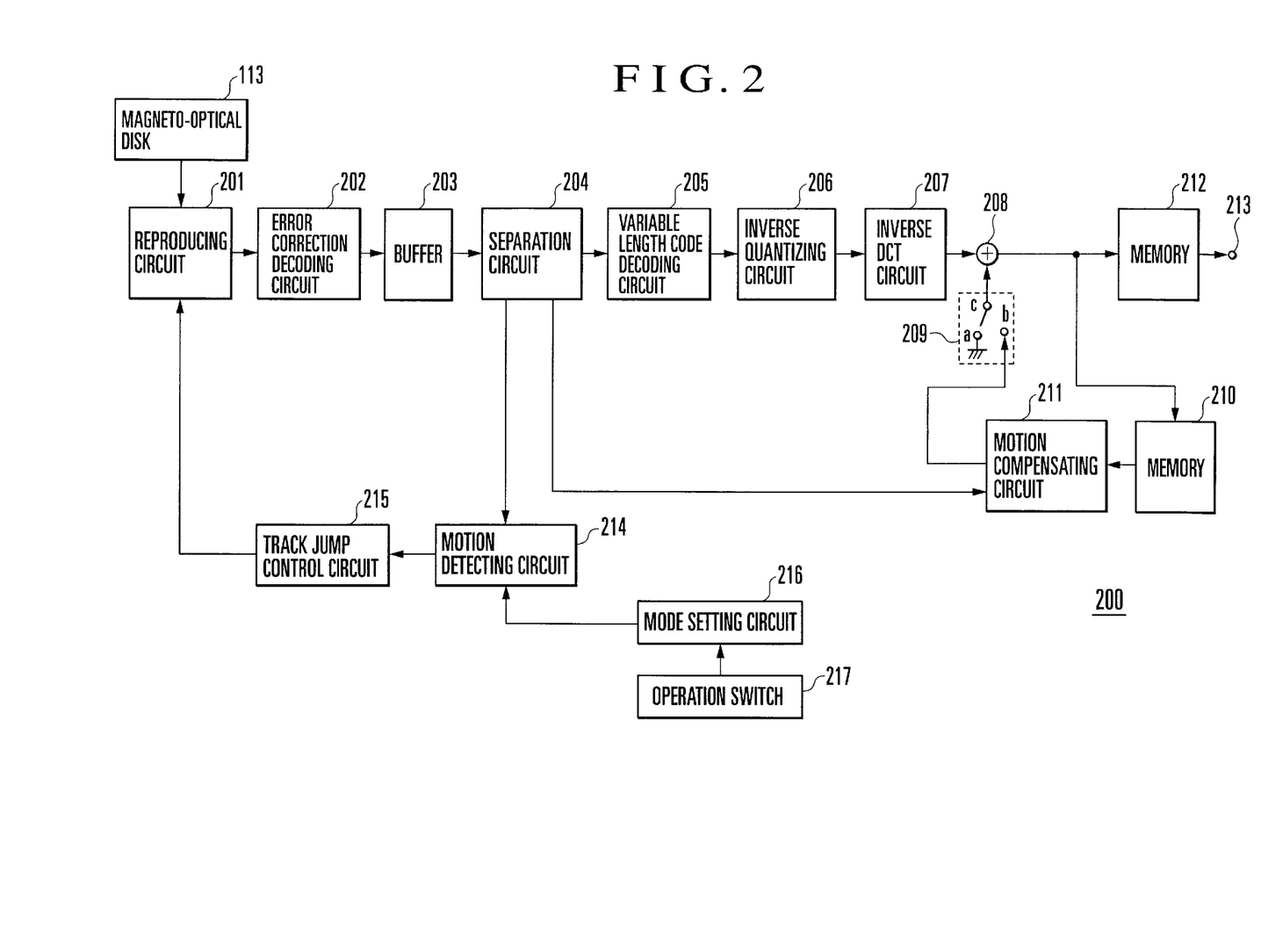
FIG. 2 is a block diagram showing the arrangement of a reproduction system of the recording-and-reproducing apparatus according to the first embodiment of the invention.

FIG. 1 is a block diagram showing the arrangement of a recording system 100 of a recording-and-reproducing apparatus according to a first embodiment of the invention, and FIG. 2 is a block diagram showing the arrangement of a reproduction system 200 of the recording-and-reproducing apparatus according to the first embodiment of the invention.

Referring to FIG. 1, the recording action of the recording system 100 is first described.

Image data obtained by an image pickup part 101 is supplied to a camera signal processing circuit 102 to be converted into a digital signal. The digital signal is subjected to signal processing actions, such as gain adjustment, color separation, tone correction, white balance adjustment, etc., for obtaining an image signal.

The image signal thus obtained is temporarily stored at a memory 103, where pictures of the image signal are rearranged. In the case of the first embodiment, the frames of image data are divided, according to the coding modes of them, into pictures of three kinds, i.e., an I picture, a P picture and a B picture. Then, a group of pictures (hereinafter referred to as GOP) which is composed of 15 frames is formed by arranging the I picture at a leading frame, the P picture at every three frames, and two frames of the B pictures between the P pictures. Thus, the pictures are rearranged by controlling the sequence of data output of these pictures from the memory 103. The GOP is a basic unit of coding in the MPEG (Moving Picture Coding Experts Group) system.

The manner of rearranging pictures is described with reference to FIGS. 3(a) and 3(b).

In the case of the first embodiment, for example, in carrying out interframe coding, a P picture frame is arranged to be at every three frames after an I picture frame. Two B picture frames are arranged to be between the P picture frames.

Figure 3A:
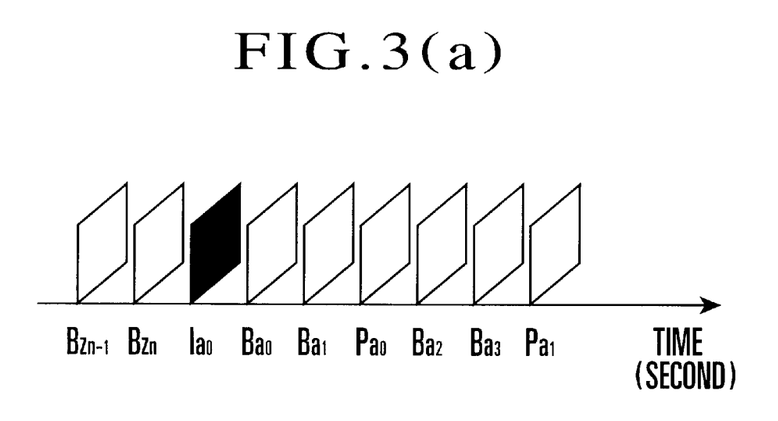

Assuming that the image input to the memory 103 shown in FIG. 3(a) is composed of frames Bzn−1, Bzn, Ia0, Ba0, Ba1, Pa0, Ba2, Ba3, Pa1, - - - , the input frames are coded respectively into B, B, I, B, B, P, B, B, P, - - - picture frames, in the sequence of input. Then, as shown in FIG. 3(b), the memory 103 outputs image data in the sequence of frames Ia0, Bzn−1, Bzn, Pa0, Ba0, Ba1, Pa1, Ba2, Ba3, Pa2, - - - .

The image data outputted from the memory 103 is sent to one terminal "a" of a switch 106, a subtracter 107 and a motion compensative prediction circuit 120.

Figure 3B:
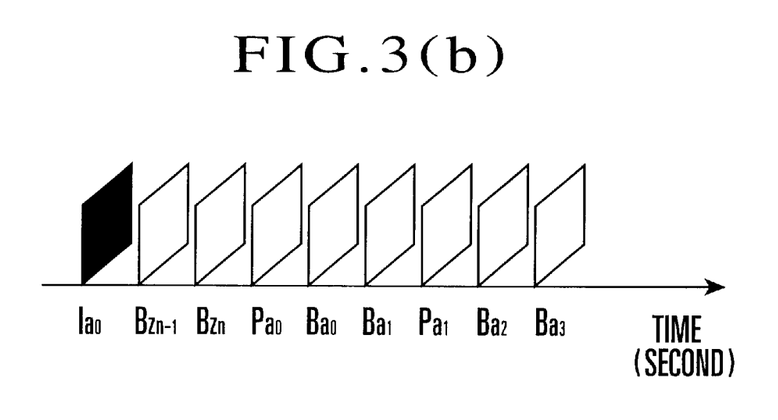

In a case where image data is inputted and processed as shown in FIGS. 3(a) and 3(b), the image data of the frame Ia0 is first read out from the memory 103 in blocks of "k×1" (8×8, for example) pixels and is supplied to the terminal "a" of the switch 106 and the subtracter 107.

The switch 106 is arranged to select the terminal "a" when the image data is the I picture frame and to select another terminal "b" when the image data is the P picture frame or the B picture frame. Therefore, in this instance, the switch 106 selects the terminal "a", and the image data of the frame Ia0 arranged in blocks is supplied to a DCT (discrete cosine transform) circuit 104.

The DCT circuit 104 is arranged to transform the image data supplied from the switch 106 into data of a frequency range by carrying out a DCT process in blocks of "8×8" pixels. The transformed data is supplied to a quantizing circuit 105.

The quantizing circuit 105 then quantizes the image data transformed by the DCT circuit 104 into the data of the frequency area. The quantized image data is then sent from the quantizing circuit 105 to each of a variable length coding circuit 108 and an inverse quantizing circuit 115. The variable length coding circuit 108 is arranged to perform a variable length coding process on the quantized data supplied from the quantizing circuit 105 by run-length coding or the like. The variable-length-coded data is sent to a multiplexing circuit 109.

The inverse quantizing circuit 115, on the other hand, inversely quantizes the image data supplied from the quantizing circuit 105 and supplies the inversely-quantized image data to an inverse DCT circuit 116. The inverse DCT circuit 116 performs an inverse DCT action on the image data supplied from the inverse quantizing circuit 115 so as to transform the image data from data of frequency area into data of two-dimensional spatial area. The data thus obtained by the inverse DCT action is supplied to an addition circuit 117.

The addition circuit 117 adds, to the data from the inverse DCT circuit 116, data supplied from a switch 119. The switch 119 is arranged to select its terminal "b" to supply "0" data to the addition circuit 117 when the image data of the I picture frame is outputted from the inverse DCT circuit 116. Therefore, the same value as the value of data obtained before decoding is supplied, as decoded data, from the addition circuit 117 to a memory 118. The decoded data is stored at a predetermined address of the memory 118.

Upon completion of coding the frame Ia0, image data are read out from the memory 103 and processed in the sequence of the frames Bzn−1 and Bzn. This process is performed in the same manner as a process on the frames Ba0 and Ba1, which will be described in detail later.

Next, the image data of the frame Pa0 is read out from the memory 103 in blocks of "k×1" pixels and is supplied to the subtracter 107 and the motion compensative prediction circuit 120. The motion compensative prediction circuit 120 searches the block data of "k×1" pixels supplied from the memory 103 for the decoded image data of the frame Ia0 stored in the memory 118 so as to find such a motion vector of data (block) that gives the smallest prediction error (difference). Then, the decoded data indicated by the motion vector is read out from the memory 118 as prediction data and is supplied to the subtracter 107 and the switch 119. Meanwhile, the motion vector thus obtained is sent to the multiplexing circuit 109 and a motion detecting circuit 121.

The subtracter 107 performs a subtracting operation on the image data of the frame Pa0 supplied from the memory 103 and the prediction data read out from the memory 118 by the motion compensative prediction circuit 120. The result of the subtraction is sent to the terminal "b" of the switch 106. The switch 106 selects the terminal "b" and supplies the output of the subtracter 107 to the DCT circuit 104 when the image data supplied from the memory 103 is the P picture frame or the B picture frame. The DCT circuit 104 performs a DCT action on the data supplied from the switch 106 to transform the image data from data of spatial area into data of frequency area. The data thus transformed is sent to the quantizing circuit 105. The quantizing circuit 105 then performs a quantizing action on the data supplied from the DCT circuit 104 and sends the quantized data to the variable length coding circuit 108 and the inverse quantizing circuit 115.

The variable length coding circuit 108 performs a variable length coding action on the quantized data supplied from the quantizing circuit 105 and sends the variable-length-coded data to the multiplexing circuit 109. The inverse quantizing circuit 115 inversely quantizes the quantized data supplied from the quantizing circuit 105. The inversely-quantized data is sent to the inverse DCT circuit 116. The inverse DCT circuit 116 then performs an inverse DCT action on the inversely-quantized data supplied from the inverse quantizing circuit 115 to transform the image data from data on a frequency axis into data of two-dimensional spatial area. The data of two-dimensional spatial area is sent from the inverse DCT circuit 116 to the addition circuit 117.

The addition circuit 117 adds data obtained from the switch 119 to the data from the inverse DCT circuit 116. The switch 119 this time has selected its terminal "a" and, as mentioned in the foregoing, the prediction data of the frame Ia0 read out from the memory 118 by the motion compensative prediction circuit 120 has been sent to the addition circuit 117. Therefore, the addition circuit 117 adds the prediction data to the data from the inverse DCT circuit 116. The result of addition is supplied from the addition circuit 117 to the memory 118 as decoded data. The decoded data from the addition circuit 117 is stored at a predetermined address of the memory 118.

Upon completion of coding the image data of the frame Pa0, the motion detecting circuit 121 obtains a total sum of absolute values of motion vectors of one frame supplied from the motion compensative prediction circuit 120 and supplies the total sum to a CPU 122 as information on the motion of the frame.

An operation switch 123 is arranged to send a signal for control over the timing of start or end of a photo-taking scene to the CPU 122 for the shift of the operation of the apparatus from one mode to another. The CPU 122 is arranged to send information on the point of change of the photo-taking scene obtained by an operation on the operation switch 123 and motion information from the motion detecting circuit 121 to the multiplexing circuit 109.

The multiplexing circuit 109 is arranged to multiplex the motion vector supplied from the motion compensative prediction circuit 120 and the motion information and the information on the scene change supplied from the CPU 122 on the variable-length-coded data supplied from the variable length coding circuit 108.

Figure 4:
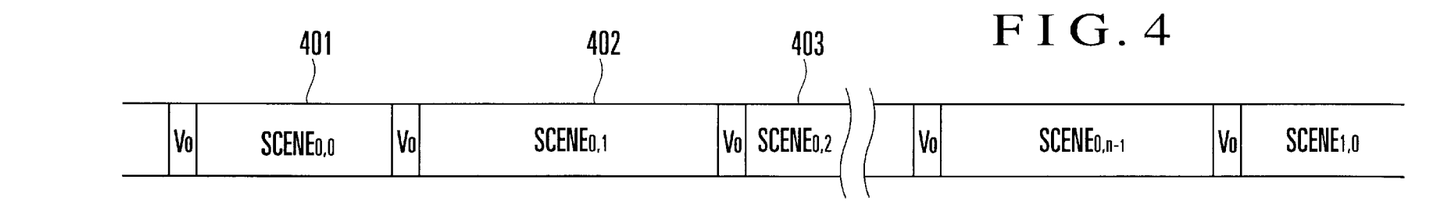
FIG. 4 is a diagram for explaining the manner of multiplexing motion information on variable-length-coded data.

The motion information is arranged as follows. With the variable-length-coded data string of the frame Ia0 assumed to be a scene 0, the code string of each scene is divided into a plurality of blocks of suitable lengths according to the recording mode of a magneto-optical disk 113. Then, the motion information is multiplexed as additional information V within the header of each of the divided blocks 401, 402 and 403, as shown in FIG. 4.

Upon completion of coding the frame Pa0, the frame Ba0 is next read out from the memory 103 to be processed in the same manner as on the frame Pa0. In this instance, however, the motion compensative prediction circuit 120 can make prediction on the basis of both the decoded data stored in the memory 118 and the frames Ia0 and Pa0. Upon completion of coding the frame Ba0, the motion detecting circuit 121 obtains a total sum of absolute values of motion vectors supplied from the motion compensative prediction circuit 120 and sends the total sum to the CPU 122 as information on the motion of the frame. The multiplexing circuit 109 multiplexes the motion vector from the motion compensative prediction circuit 120 and the motion information from the CPU 122 on the variable-length-coded data string of the frame Ba0.

The frame Ba1 is processed in the same manner as the frame Ba0. After the frame Ba1, the frame Pa1 is processed.

In processing the frame Pa1, the motion compensative prediction circuit 120 obtains a motion vector by making prediction from the decoded data of the frame Pa1 and sends the motion vector to the motion detecting circuit 121 and the multiplexing circuit 109. Upon completion of coding the image data of the frame Pa1, the motion detecting circuit 121 obtains a total sum of absolute values of motion vectors supplied from the motion compensative prediction circuit 120 and sends the total sum to the CPU 122 as information on the motion of the frame. The multiplexing circuit 109 multiplexes the motion vector from the motion compensative prediction circuit 120 and the motion information from the CPU 122 on the variable-length-coded data string of the frame Pa1.

The multiplexed data obtained by multiplexing the motion vector and the motion information on the coded image data is sent from the multiplexing circuit 109 to a buffer 110. The buffer 110 performs a buffering action on the data supplied and sends the data to an error correction circuit 111. The error correction circuit 111 performs an error-correcting coding action on the data to make the data suited for recording on the magneto-optical disk 113. The data thus processed is sent from the error correction circuit 111 to a recording circuit 112. The recording circuit 112 is composed of a light beam emitting part, a magnetic head, a disk driving part, etc., which are arranged in a known manner. The recording circuit 112 records the data supplied from the error correction circuit 111 on the magneto-optical disk 113.

A rate control circuit 114 is arranged to check the data storing amount of the buffer 110 and to control the quantizing step of the quantizing circuit 105 in such a way as to make a rate of recording constant.

After the above-stated processes, other frames are serially processed in the order of the frame Ba2 and the frame Ba3 and are recorded also on the disk 113.

A reproducing operation on the data recorded on the disk 113 to be performed by the reproduction system 200 shown in FIG. 2 is next described.

Referring to FIG. 2, a reproducing circuit 201 is arranged to reproduce data from the disk 113. The data reproduced is sent to an error correction decoding circuit 202. The reproducing circuit 201 is arranged to use a light laser driver, a driving part, etc., in common with the recording circuit 112.

The error correction decoding circuit 202 is arranged to correct errors in the reproduced data and to send the corrected reproduced data to a buffer 203. The buffer 203 is arranged to perform a buffering action on the reproduced data in accordance with a decoding process and to send the processed data to a separation circuit 204. The separation circuit 204 is arranged to separate variable-length-coded data, a motion vector and motion information from the reproduced data supplied from the buffer 203 and to send them respectively to a variable length code decoding circuit 205, a motion compensating circuit 211 and a motion detecting circuit 214.

The variable length code decoding circuit 205 is arranged to decode the variable-length-coded data supplied from the separation circuit 204 and to send the decoded data to an inverse quantizing circuit 206. The inverse quantizing circuit 206 is arranged to inversely quantize the decoded data supplied from the variable length code decoding circuit 205 and to send the inversely-quantized data to an inverse DCT circuit 207. The inverse DCT circuit 207 is arranged to perform an inverse DCT action on the data supplied from the inverse quantizing circuit 206 to transform the data from data of a frequency area into data of a two-dimensional spatial area and to send the transformed data to an addition circuit 208.

The addition circuit 208 is arranged to add the data supplied from the inverse DCT circuit 207 to data supplied from a switch 209. The switch 209 is arranged to select its terminal "a" to supply data "0" to the addition circuit 208, when data of the I picture frame is reproduced, and to select its terminal "b" to supply data from the motion compensating circuit 211 to the addition circuit 208 when data of the P or B picture frame is reproduced.

Therefore, in a case where data of the frame Ia0 is reproduced, the switch 209 selects its terminal "a" to supply the data "0" to the addition circuit 208. The addition circuit 208 then outputs data which is of the same value as the data supplied from the inverse DCT circuit 207 as decoded data. The decoded data is sent to memories 210 and 212. Each of the memories 210 and 212 stores the decoded data from the addition circuit 208 at a predetermined address.

Upon completion of decoding for the frame Ia0, the data of frames Bzn−1 and Bzn is reproduced. However, since the data is processed in the same manner as data of frames Ba0 and Ba1, the details of the process are described later in the description of the process for the frames Ba0 and Ba1.

Next, data of the frame Pa0 is reproduced from the disk 113. The reproduced data is sent to the error correction decoding circuit 202 to be processed in the same manner as described above by the error correction decoding circuit 202, the buffer circuit 203, the separation circuit 204, the variable length code decoding circuit 205, the inverse quantizing circuit 206 and the inverse DCT circuit 207. The inversely-DCT-processed data is supplied to the addition circuit 208.

In this instance, the motion compensating circuit 211 reads, from the memory 210, the decoded data of the frame Ia0 indicated by the reproduced motion vector supplied from the separation circuit 204, and supplies the decoded data to the terminal "b" of the switch 209. Since the switch 209 has selected the terminal "b", the switch 209 sends the data from the motion compensating circuit 211 to the addition circuit 208. The addition circuit 208 adds the data from the switch 209 to the data supplied from the inverse DCT circuit 207 and sends the sum of data to the memories 210 and 212. Each of the memories 210 and 212 then stores the received data at a predetermined address.

After the data of the frame Pa0, data of the frame Ba0 is reproduced from the disk 113. The reproduced data is sent to the error correction decoding circuit 202 to be processed, in the same manner as mentioned above, by the error correction decoding circuit 202, the buffer circuit 203, the separation circuit 204, the variable length code decoding circuit 205, the inverse quantizing circuit 206 and the inverse DCT circuit 207. The data thus processed by the inverse DCT circuit 207 is sent to the addition circuit 208.

In this instance, the motion compensating circuit 211 reads out from the memory 210 the decoded data of the frame Ia0 or Pa0 indicated by the motion vector supplied from the separation circuit 204, and supplies the decoded data to the terminal "b" of the switch 209. Since the switch 209 has selected the terminal "b", the switch 209 sends the data from the motion compensating circuit 211 to the addition circuit 208. The addition circuit 208 adds the data from the switch 209 to the data supplied from the inverse DCT circuit 207 and sends the sum of data to the memories 210 and 212. Each of the memories 210 and 212 then stores the received data at a predetermined address.

After that, data of the frames Ba1, Pa1, Ba2, Ba3, - - - , are reproduced from the recording medium, i.e., the disk 113, to be processed one after another.

The memory 212 stores image data of the frames Ia0, Bzn−1, Bzn, Pa0, Ba0, Ba1, Ba2, Ba3, - - - , reproduced from the disk 113 and decoded in this sequence. The image data thus stored is read out from the memory 212 in the sequence of display of the frames Bzn−1, Bzn, Ia0, Ba0, Ba1, Pa0, Ba2, Ba3, Pa1, - - - . The image data thus read out is sent out through an output terminal 213 to an external apparatus, such as a monitor or the like (not shown).

Next, the operation of the reproduction system 200 shown in FIG. 2 to be performed in a search mode is described as follows.

In a case where the search mode is set by an operation switch 217, information on the search mode (for example, information Smode on the degree of speed of the search) is sent to the motion detecting circuit 214 from a mode setting circuit 216. The motion detecting circuit 214 then decides a track jump amount Mt on the basis of motion information Vx supplied from the separation circuit 204 and the information Smode on the search mode supplied from the mode setting circuit 216. Information on the track jump amount Mt is sent to a track jump control circuit 215.

In the first embodiment, the track jump amount Mt is decided on the basis of the following formula:

$$Mt = (\alpha \times Smode)/Vx \quad (\alpha\text{: a coefficient}) \qquad (1)$$

In Formula (1) above, "Vx" represents a value to be decided on the basis of the motion vector. The value Vx increases accordingly as the motion becomes larger. The value Vx becomes "1" (Vx=1) when there is no motion. The track jump amount Mt is, therefore, smaller accordingly as the motion of images is larger. Further, "α×Smode" represents a reference speed (the number of track jumps) in the search mode.

The track jump control circuit 215 is arranged to control the reproducing tracks of the disk 113 by controlling the position of the light beam head of the reproducing circuit 201 according to the track jump amount Mt supplied from the motion detecting circuit 214.

Figure 5:
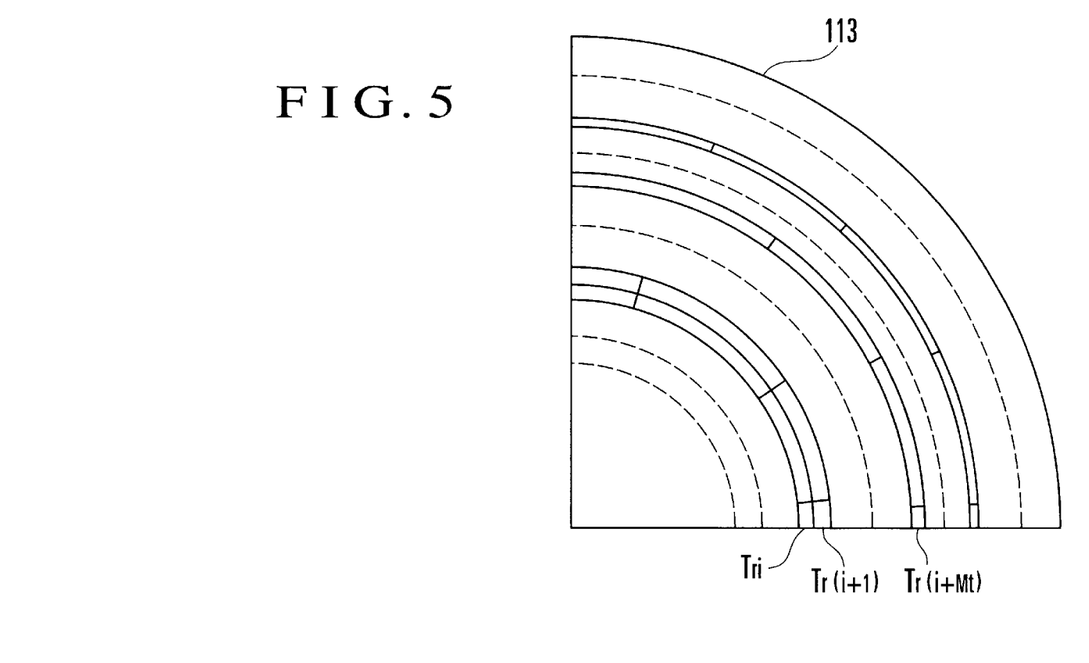
FIG. 5 is a diagram for explaining the positional relation of tracks subjected to reproduction from a recording medium.

For example, the light beam head is assumed to obtain the reproduced data of the frames Ia0, Bzn−1, Bzn, Pa0 Ba0, Ba1, - - - , by reproducing a track Tri of the disk 113, as shown in FIG. 5. In the normal reproduction mode, the data of a track Tr(i+1) is next reproduced. In the case of the search reproduction mode, however, the track jump control circuit 215 controls and causes the reproducing head to reproduce the recorded data of a track Tr(i+Mt) in accordance with information on the track jump amount Mt supplied from the motion detecting circuit 214.

The first embodiment is arranged, as described above, to obtain the motion information by detecting the motion of moving image data of each frame to be recorded and to record, on the disk, the motion information along with coded image data.

In the case of the search reproduction (special reproduction) mode, the first embodiment controls the track jump amount of the reproducing head on the basis of the motion information reproduced. The control over the track jump amount is performed in such a manner that, for image data of parts where the reproduced image moves fast or where a scene greatly changes, the track jump amount is lessened to substantially decrease the reproduction speed and to make reproduction time intervals of images denser.

This enables the user of the apparatus to easily grasp the contents of the recorded image.

Further, for an image which does not move much or a scene which does not much change, the control is made to increase the track jump amount to substantially increase the reproduction speed and to make reproduction time intervals of images coarse in such a way as to have one picture changed over to another as fast as possible. That enables the user to find the contents of the recorded image at an appropriate speed without feeling any lengthy time of waiting for the search.

With respect to the detection of motions to be recorded, the arrangement for detecting motions of images by utilizing the results of the action of the motion compensative prediction circuit 120 in the interframe coding process permits reduction in amount of hardware and simplification of processes.

Further, the motion detecting circuit 121 in FIG. 1 may be arranged to obtain a total sum of motion vectors supplied from the motion compensative prediction circuit 120. Such an arrangement gives the same advantage as the above-stated advantage.

Further, the use of the magneto-optical disk 113 as a recording medium may be replaced with a magnetic tape. In the case of a magnetic tape, the reproduction speed is controlled by controlling the speed of transport of the tape.

(Second Embodiment)

Figure 6:
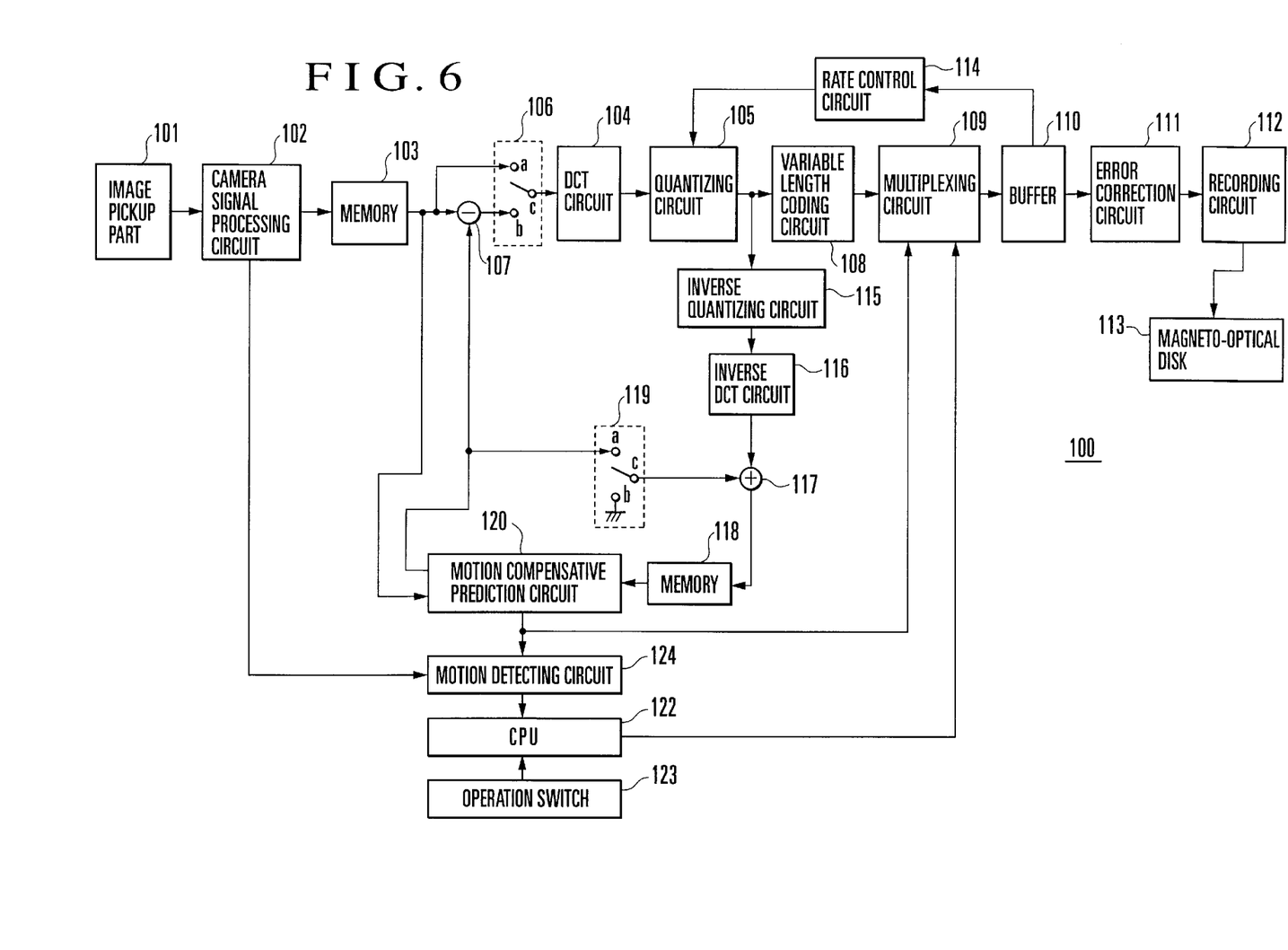
FIG. 6 is a block diagram showing the arrangement of a recording system of a recording-and-reproducing apparatus according to a second embodiment of the invention.

FIG. 6 is a block diagram showing the arrangement of a recording system of a recording-and-reproducing apparatus according to a second embodiment of the invention. In FIG. 6, all parts that correspond to those shown in FIG. 1 are indicated by the same reference numerals as in FIG. 1. The details of such parts are omitted from the description. Further, the arrangement of a reproduction system of the recording-and-reproducing apparatus according to the second embodiment is identical with that shown in FIG. 2.

Referring to FIG. 6, a camera signal processing circuit 102 is arranged to perform a correcting process for correcting an image shake. For this process, one frame is divided into several small blocks, and a motion vector is detected between temporally adjacent frames for every one of these small blocks. Image shake correction is made by using the motion vectors thus detected.

Information on the motion vectors thus detected is sent from the camera signal processing circuit 102 to a motion detecting circuit 124. The motion detecting circuit 124 obtains, for example, a total sum of the motion vectors supplied from the camera signal processing circuit 102 and sends information on the total sum to a CPU 122 as motion information of the frame. Then, as in the case of the apparatus shown in FIG. 1, the CPU 122 sends the frame motion information supplied from the motion detecting circuit 124 to a multiplexing circuit 109. The multiplexing circuit 109 then multiplexes the motion information supplied from the CPU 122 on variable-length-coded data corresponding to the motion information. Then, the multiplexed information is outputted. In the second embodiment, the coding, recording and reproduction processes are performed in the same manner as in the case of the first embodiment described in the foregoing.

The second embodiment is arranged, as described above, to obtain the motion information by detecting the motion of moving image data of each frame to be recorded and to record, on the disk, the motion information along with coded image data.

In the case of the search reproduction (special reproduction) mode, the second embodiment controls the track jump amount of the reproducing head on the basis of the motion information reproduced. The control over the track jump amount is performed in such a manner that, for image data of parts where the reproduced image moves fast or where a scene greatly changes, the track jump amount is lessened to substantially decrease the reproduction speed and to make reproduction time intervals of images denser.

This enables the user of the apparatus to easily grasp the contents of the recorded image.

Further, for an image which does not move much or a scene which does not much change, the control is made to increase the track jump amount to substantially increase the reproduction speed and to make reproduction time intervals of images coarse in such a way as to have one picture changed over to another as fast as possible. That enables the user to find the contents of the recorded image at an appropriate speed without feeling any lengthy time of waiting for the search.

With respect to the detection of motions to be recorded, the arrangement for detecting motions by utilizing the results of the camera signal processing permits reduction in amount of hardware and simplification of processes.

(Third Embodiment)

Figure 7:
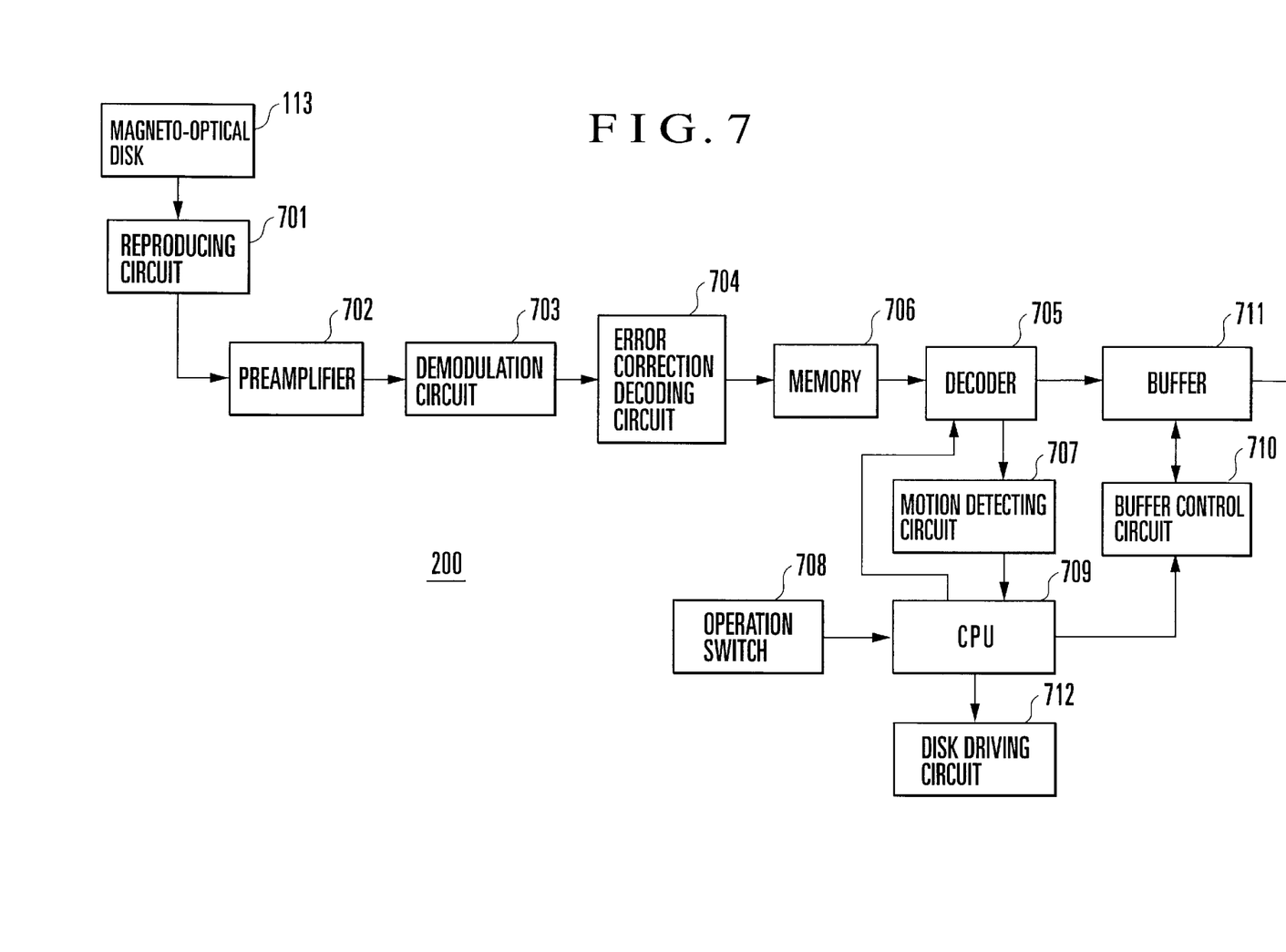
FIG. 7 is a block diagram showing the arrangement of a reproduction system of a recording-and-reproducing apparatus according to a third embodiment of the invention.

FIG. 7 is a block diagram showing the arrangement of a reproduction system of a recording-and-reproducing apparatus according to a third embodiment of the invention. The reproduction system shown in FIG. 7 is arranged to reproduce data recorded on the disk 113 by the recording system shown in FIG. 1 or FIG. 6 as described in the foregoing.

Referring to FIG. 7, a reproducing circuit 701 is arranged to reproduce data recorded on the disk 113 by using a light laser and to send the reproduced data to a preamplifier 702. The preamplifier 702 amplifies the reproduced data up to a predetermined level and sends the amplified data to a demodulation circuit 703.

The demodulation circuit 703 is arranged to obtain reproduced demodulated data by detecting digital data from the reproduced data and carrying out a demodulation process. The reproduced data is then subjected to an error correction process at an error correction decoding circuit 704. The error-corrected data thus obtained is written into a memory 706. The decoder 705 performs a decoding action on compressed image data stored in the memory 706 according to a coding action performed at the time of recording. The decoder 705 further supplies to a motion detecting circuit 707 the motion information multiplexed at the time of recording and included in the reproduced data string stored in the memory 706. The motion detecting circuit 707 detects the motion information supplied by the decoder 705. The motion information thus detected is sent to a CPU 709. Further, the image data decoded by the decoder 705 is outputted through a buffer 711.

The memory 706 is arranged to be capable of storing an amount of compressed image data corresponding to several GOPs (10 GOPs in the case of the third embodiment). The buffer 711 is arranged to be capable of storing an amount of decoded image data corresponding to several frames (20 frames in the case of the third embodiment). A buffer control circuit 710 controls, on the basis of a control signal from the CPU 709, image data writing and reading actions on the buffer 711.

The third embodiment is arranged to perform a normal reproducing operation in the following manner.

Upon receipt of an instruction for a normal reproduction mode from an operation switch 708, the CPU 709 controls a disk driving circuit 712 to cause the disk 113 to rotate at a speed corresponding to a speed used for recording. Then, data reproduced from the disk 113 is written into the memory 706 through the preamplifier 702, the demodulation circuit 703 and the error correction decoding circuit 704.

In the normal reproduction mode, the CPU 709 controls the decoder 705 in such a way as to cause the decoder 705 to read out the stored image data from the memory 706 in the sequence of reproduction thereof and to decode the read-out image data. The image data decoded by the decoder 705 is written into the buffer 711.

Further, in the normal reproduction mode, the CPU 709 controls the buffer control circuit 710 in such a way as to completely read out the image data from the decoder 705 in the sequence of input thereof and to output the read-out image data.

Next, an operation of the third embodiment to be performed in a search reproduction mode is described.

When an instruction for the search reproduction mode is received from the operation switch 708, the CPU 709 controls the disk driving circuit 712 to cause the disk 113 to rotate at a high speed which is at least ten times as high as the speed in the normal reproduction mode. Then, the reproducing circuit 701 reproduces data at a high speed which is at least ten times as high as the speed in the normal reproduction mode. The data reproduced from the disk 113 is written into the memory 706 through the preamplifier 702, the demodulation circuit 703, the error correction decoding circuit 704 and the decoder 705, as mentioned above. In short, according to the third embodiment, in the search reproduction mode, all the data recorded on the disk 113 is thus reproduced at a high speed which is at least ten times as high as the speed in the normal reproduction mode. Therefore, the reproduction data rate obtained in the search reproduction mode is at least ten times as high as the data rate obtained in the normal reproduction mode.

In the search reproduction mode, the CPU 709 controls reading the coded image data out from the memory 706 and writing and reading the image data into and out of the buffer 711 in accordance with the motion information of each frame obtained from the motion detecting circuit 707.

More specifically, the CPU 709 controls the decoder 705 and the buffer control circuit 710 in the following manner. The image data stored in the memory 706 is decoded and only the image data of such frames that show large motions among the image data of 10 GOPs (150 frames) is written into the buffer 711.

For example, in a case where reproduction is to be made at the ten-times high speed in the search reproduction mode, the decoder 705 and the buffer control circuit 710 are controlled in such a way as to select and extract, from among the image data of 10 GOPs (150 frames) stored in the memory 706, the image data of 15 frames, which are 1/10 of the 150 frames, according to the motions of the respective frames.

Figure 8A:
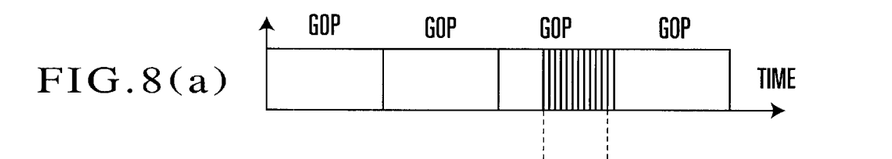
Figure 8B:
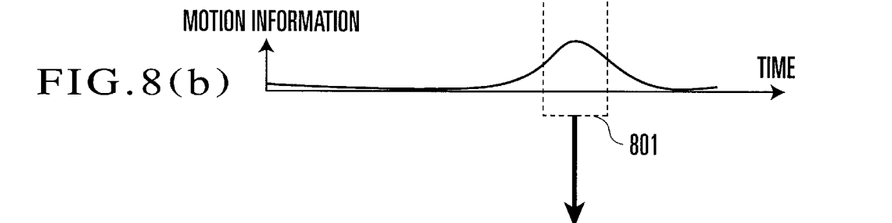
Figure 8C:
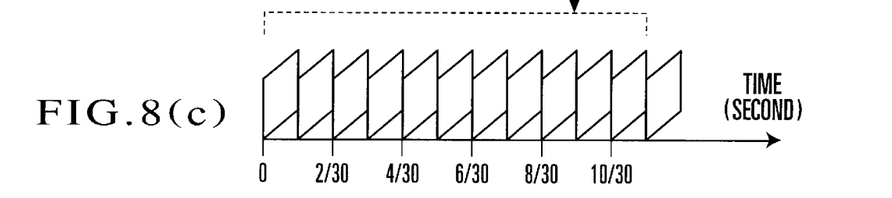

FIGS. 8(*a*) to 8(*c*) show this operation in a time chart.

FIG. 8(*a*) shows the reproduced image data stored in the memory 706. FIG. 8(*b*) shows the motion information of each image data shown in FIG. 8(*a*). FIG. 8(*c*) shows video images to be displayed, i.e., images to be outputted from the buffer 711.

The CPU 709 controls the decoder 705 and the buffer control circuit 710 in such a way as to store image data of 15 frames among a total of 150 frames in the buffer 711 with the image data of a frame which shows the largest motion among 15 frames set at the center of them. In the case of FIG. 8(*b*), the image data of 15 frames within a range indicated by a broken line is stored in the buffer 711.

The CPU 709 further controls the buffer control circuit 710 in such a way as to read out from the buffer 711 the image data of each frame at such timing that corresponds to a normal time base (30 frames/sec).

With the third embodiment arranged in the above manner, in the search reproduction mode, all the image data recorded on the disk is read out at a high speed. Then, some of all the reproduced image data is selected and outputted according to the motions of frames. The apparatus is thus arranged to be capable of smoothly making the search reproduction according to motions of reproduced images.

Incidentally, in the third embodiment, the capacity of the memory 706 and that of the buffer 711 are respectively set at 10 GOPs and 20 frames. However, these setting values of storage capacity may be appropriately changed according to the speed of search reproduction.

(Fourth Embodiment)

Figure 9:
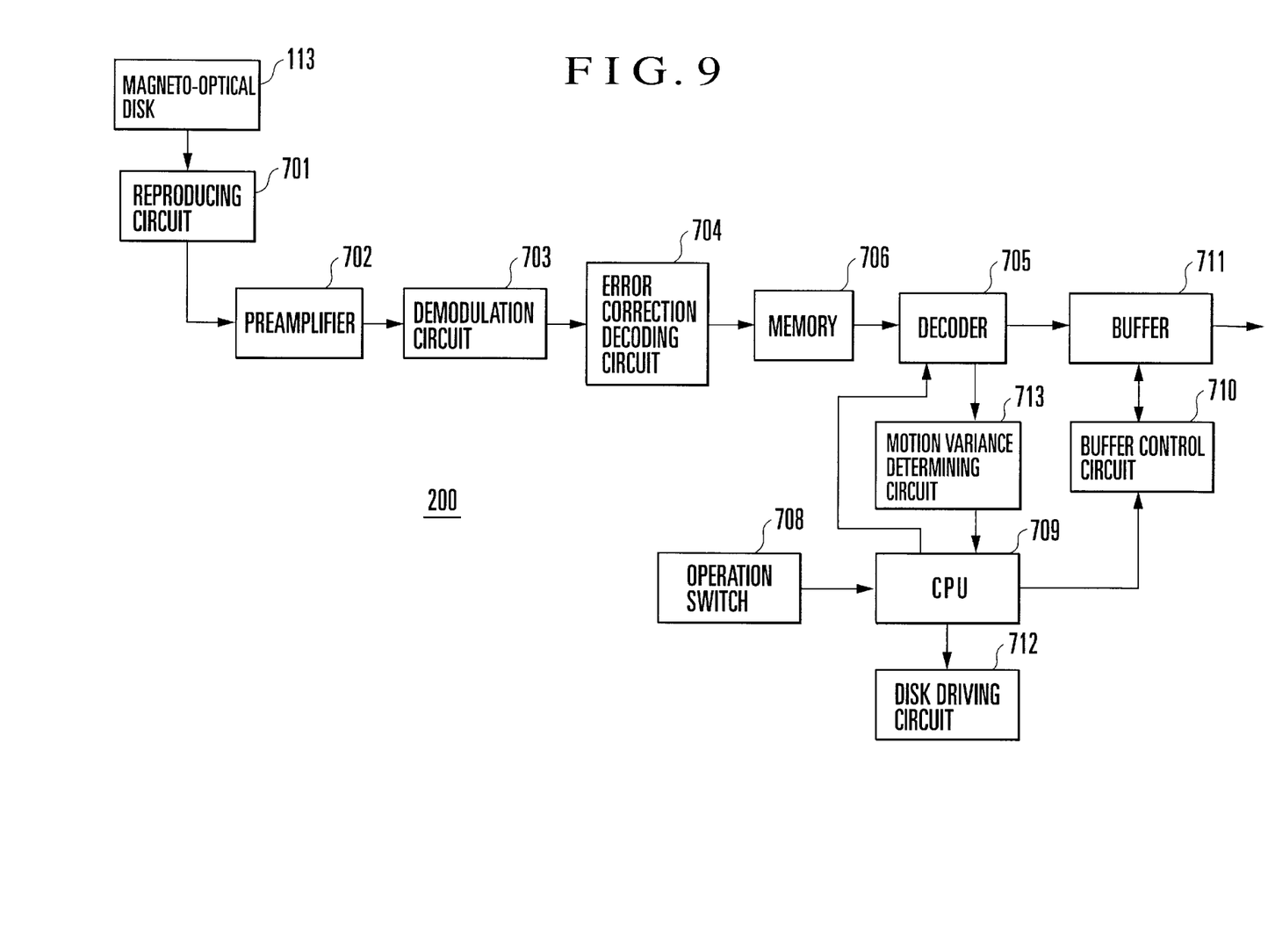
FIG. 9 is a block diagram showing the arrangement of a reproduction system of a recording-and-reproducing apparatus according to a fourth embodiment of the invention.

FIG. 9 is a block diagram showing the arrangement of a reproduction system of a recording-and-reproducing apparatus according to a fourth embodiment of the invention. In FIG. 9, the parts corresponding to those shown in FIG. 7 are indicated by the same reference numerals as in FIG. 7, and the details of them already described in the foregoing are omitted from the following description to avoid duplication. The reproduction system shown in FIG. 9 is arranged to reproduce data recorded on the disk 113 by the recording system shown in FIG. 1 or FIG. 6 described in the foregoing.

As in the case of the reproduction system shown in FIG. 7, the data recorded on the disk 113 is reproduced by a reproducing circuit 701. The reproduced data is processed through a preamplifier 702, a demodulation circuit 703, an error correction decoding circuit 704 and a decoder 705. The data thus processed is written into a memory 706. The decoder 705 decodes the image data written into the memory 706 and sends the decoded image data to a buffer 711, and also sends to a motion variance determining circuit 713 the motion information which has been added in recording as mentioned in the foregoing. The motion variance determining circuit 713 determines the variance of motions in the direction of time base on the basis of the motion information supplied from the decoder 705.

Next, an operation of the fourth embodiment to be performed in a search reproduction mode is described.

When an instruction for the search reproduction mode is received from the operation switch 708, the CPU 709 controls the disk driving circuit 712 to cause the disk 113 to rotate at a high speed which is at least ten times as high as the speed in the normal reproduction mode. Then, the reproducing circuit 701 reproduces data at a high speed which is at least ten times as high as the speed in the normal reproduction mode. The data reproduced from the disk 113 is written into the memory 706 through the preamplifier 702, the demodulation circuit 703 and the error correction decoding circuit 704, as mentioned above.

In the search reproduction mode, the CPU 709 controls reading the coded image data out from the memory 706 and writing and reading the image data into and out of the buffer 711 in accordance with the motion variance information obtained from the motion variance determining circuit 713.

Figure 10A:
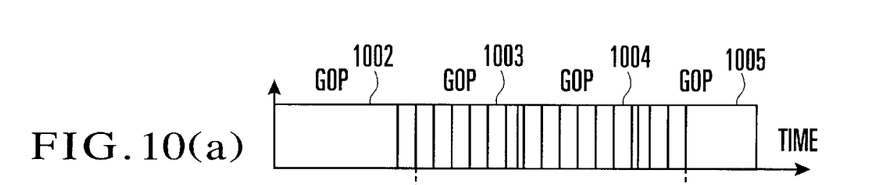
Figure 10B:
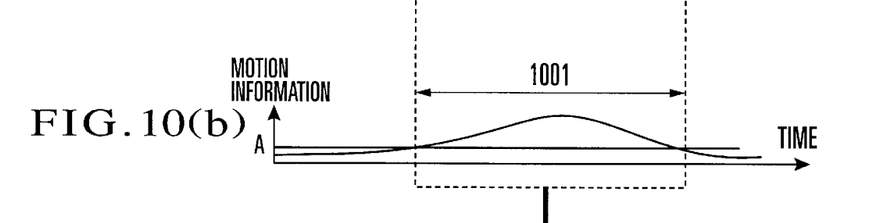
Figure 10C:
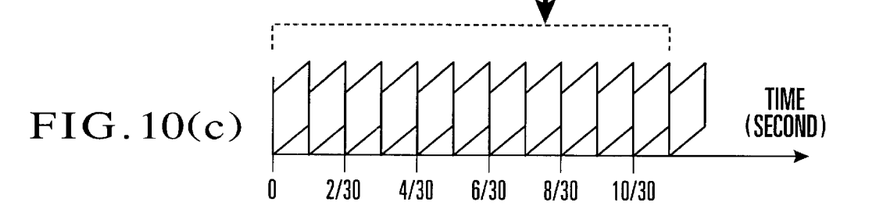

FIGS. 10(*a*) to 10(*c*) show this operation in a time chart.

FIG. 10(*a*) shows the state of reproduced image data. FIG. 10(*b*) shows the state of the motion information of each frame. FIG. 10(*c*) shows video images to be displayed, i.e., images to be outputted from the buffer 711.

The motion variance determining circuit 713 is arranged to detect, in units of 10 GOPs (150 frames), a motion information period 1001 in which the value of the motion information exceeds a predetermined value "A" among the image data of the 10 GOPs. The result of detection is sent from the motion variance determining circuit 713 to the CPU 709. The CPU 709 then selects frames to be written into the buffer 711, according to the position and length of the period 1001 in the 10 GOPs and the speed of the search reproduction.

In other words, if the period 1001, i.e., a motion variance period, is found, for example, to be extending from the third frame of the second GOP 1003 over to the seventh frame of the fourth GOP 1005, as shown in FIG. 10(*a*), the CPU 709 controls the decoder 705 and the buffer control circuit 710 in such a way as to, after decoding the image data stored in the memory 706, select image data of 15 frames at equal intervals within the period 1001 and write the selected image data into the buffer 711.

Accordingly, the length of frame intervals of image data to be written into the buffer 711 becomes long if the motion variance period 1001 is long, and the length of frame intervals of image data to be written into the buffer 711 becomes short if the motion variance period 1001 is short.

Further, in a case where the number of frames in which the value of the motion information exceeds the predetermined value "A", among the image data of 10 GOPs stored at the memory 706, is less than "15", image data of fifteen frames composed of a frame that shows the largest motion, seven frames before that frame and seven frames behind that frame is written in the butter 711, in the same manner as in the third embodiment.

With the fourth embodiment thus arranged to detect the variance of motions on the basis of the motion information and to selectively output the reproduced image data according to the detected variance of motions, a search can be smoothly carried out according to the motions of reproduced images.

(Fifth Embodiment)

Figure 11:
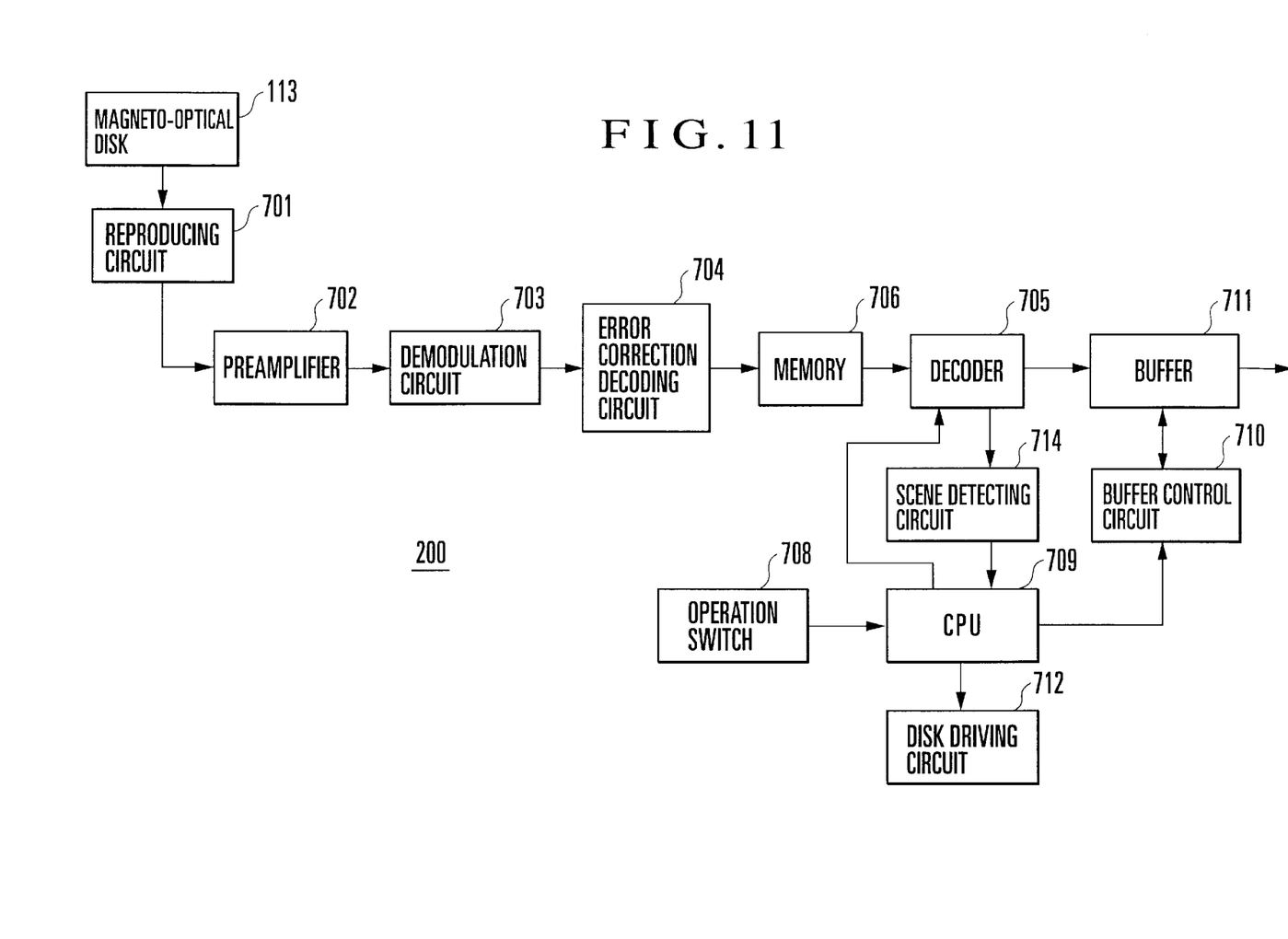
FIG. 11 is a block diagram showing the arrangement of a reproduction system of a recording-and-reproducing apparatus according to a fifth embodiment of the invention.

FIG. 11 is a block diagram showing the arrangement of a reproduction system of a recording-and-reproducing apparatus according to a fifth embodiment of the invention. In FIG. 11, parts corresponding to those shown in FIGS. 7 and 9 are indicated by the same reference numerals as in FIGS. 7 and 9, and the details of them already described in the foregoing are omitted from the following description to avoid duplication. The reproduction system shown in FIG. 11 is arranged to reproduce data recorded on the disk 113 by the recording system shown in FIG. 1 or FIG. 6 described in the foregoing.

Referring to FIG. 11, the data recorded on the disk 113 is reproduced by a reproducing circuit 701. The reproduced data is processed through a preamplifier 702, a demodulation circuit 703, an error correction decoding circuit 704 and a decoder 705. The data thus processed is written into a memory 706. The decoder 705 decodes the image data written into the memory 706 and sends the decoded image data to a buffer 711, and also sends the above-mentioned scene change information to a scene detecting circuit 714.

Next, an operation of the fifth embodiment to be performed in a search reproduction mode is described.

When an instruction for the search reproduction mode is received from the operation switch 708, the CPU 709 controls the disk driving circuit 712 to cause the disk 113 to rotate at a high speed which is at least ten times as high as the speed in the normal reproduction mode. Then, the reproducing circuit 701 reproduces data at a high speed which is at least ten times as high as the speed in the normal reproduction mode. The data reproduced from the disk 113 is written into the memory 706 through the preamplifier 702, the demodulation circuit 703 and the error correction decoding circuit 704.

In the search reproduction mode, the CPU 709 controls reading the coded image data out from the memory 706 and writing and reading the image data into and out of the buffer 711 in accordance with the scene change information obtained from the scene detecting circuit 714.

In other words, the CPU 709 makes a check, according to the scene change information, to find if the image data written into the memory 706 includes any image data indicating a change of scene. If a change of scene is thus found, the CPU 709 controls the decoder 705 and the buffer control circuit 710 in such a way as to, after decoding the image data stored in the memory 706, select and write into the buffer 711 the image data of 15 frames, with a frame at which the change of scene is found set as the leader of the 15 frames.

In a case where there is no change of scene, the CPU 709 controls the decoder 705 and the buffer control circuit 710 in such a way as to write into the buffer 711 the image data of the leading GOP of the image data of 10 GOPs stored in the memory 706.

With the fifth embodiment thus arranged to selectively output the image data according to the scene change information in the reproduced image data, the search reproduction can be carried out according to changes taking place from one scene to another.

In each of the embodiments described above, the image data recorded on the disk is reproduced by rotating the disk at a higher speed in the search reproduction mode than the speed in the normal reproduction mode. However, the invention is not limited to this arrangement. For example, the apparatus according to the invention may be arranged to read the image data out from the disk only once during "n" rotations of the disk in the normal reproduction mode, and to read the image data all "n" times during "n" rotations of the disk in the search reproduction mode without changing the disk rotating speed of the normal reproduction mode.

Such an arrangement is possible because, in the case of the recording system shown in FIG. 1 or FIG. 6, the data rate recordable on the disk 113 by the recording circuit 112 is "n" times as much as the data rate of the output from the buffer 110. Hence, the recording circuit 112 can record data at the rate of once for every "n" rotations of the disk 113.

Further, with regard to reproduction, the data can be reproduced once for every "n" rotations of the disk 113 in the normal reproduction mode. Therefore, the search reproduction can be performed to read data at every one of "n" rotations of the disk 113 without changing the disk rotating speed of the normal reproduction mode.

The invention is applicable also to a storage medium as a further embodiment thereof. Such an embodiment is next described below.

The apparatuses shown in FIGS. 1, 2, 6, 7, 9 and 11 can be arranged by a computer system including a CPU and a memory, as well as by hardware. In a case where the apparatus is to be arranged in the computer system, the memory constitutes a storage medium according to the invention. The storage medium is arranged to store a program for execution of steps of control over the actions of each of the embodiments disclosed in the foregoing.

Further, the above-stated storage medium is selectable from among semiconductor memories such as a ROM, a RAM, etc., an optical disk, a magneto-optical disk, a magnetic medium, etc. The storage medium also may be in the form of a CD-ROM, a floppy disk, a magnetic tape, a magnetic card, a nonvolatile memory card or the like.

The storage medium can be employed in any of the systems and apparatuses other than those shown in FIGS. 1, 2, 6, 7, 9 and 11. With the storage medium employed, the system or a computer becomes capable of carrying out functions equivalent to those of the above-described embodiments by reading out program codes stored in the storage medium and executing them, so that the object of the invention can be attained.

Further, functions equivalent to those of the above-described embodiments can be carried out to give the same advantages as the above-described embodiments also in cases where the processes described in the foregoing are to be carried out either in part or in their entirety by an OS (operating system) or the like operating on a computer, or where the program codes read out from the storage medium are to be written into a memory provided on an extended function board inserted in a computer or included in an extended function unit connected to a computer and, after that, the processes are to be carried out either in part or in their entirety by a CPU or the like provided on the extended function board or the extended function unit, on the basis of instructions of the program codes, so that the object of the invention can be attained.

What is claimed is:

1. A reproducing apparatus comprising:

input means for inputting moving image data;

an encoder which detects a motion of the moving image data and encodes the moving image data in accordance with a motion information indicating said detected motion;

generating means for generating motion data indicating the motion of the moving image data using the motion information;

recording means for generating a data string by multiplexing the moving image data encoded by said encoder and the motion data and recording the data string on a disk recording medium;

reproducing means for reproducing the data string from the disk recording medium by moving a pick-up unit which picks up the data string from the tracks of the disk recording medium; and control means for controlling a reproduction speed of the moving image data by said reproducing means by changing an amount of movement of said pick-up unit according to the motion of the moving image data indicated by said motion data included in the data string reproduced by said reproducing means.

2. A reproducing apparatus according to claim 1, wherein said control means decides the amount of movement of said pick-up unit by performing a computing operation on the motion data according to a predetermined function.

3. A reproducing apparatus according to claim 1, further comprising:

a decoder which decodes the moving image data included in the data string reproduced by said reproducing means in accordance with the motion information recorded with the moving image data on the disk recording medium and reproduced by said reproducing means.

4. A reproducing apparatus according to claim 1, wherein said encoder encodes the moving image data with interpicture motion compensative prediction encoding method by using the motion information.

5. A reproducing apparatus comprising:

reproducing means for reproducing from a recording medium a data string including moving image data and motion data indicating motion of an image represented by said moving image data, the motion data being formed according to information on image shakes obtained during an image pickup operation for the moving image data; and control means for controlling a reproduction speed of the moving image data by said reproducing means according to the motion data included in the data string reproduced by said reproducing means.

6. A reproducing apparatus comprising:

reproducing means for reproducing from a disk recording medium a data string including moving image data and motion data indicating motion of an image represented by said moving image data;

output means for outputting the moving image data reproduced by said reproducing means; and control means for controlling said output means to select, from among the moving image data of a plurality of pictures reproduced by said reproducing means, image data of pictures that are part of the plurality of pictures, on the basis of the motion data reproduced by said reproducing means and to output the selected image data.

7. A reproducing apparatus according to claim 6, wherein said control means selects pictures to be outputted by said output means, according to a reproduction speed of the moving image data by said reproducing means.

8. A reproducing apparatus according to claim 7, wherein said control means decides the number of pictures to be outputted by said output means, according to the reproduction speed of the image data by said reproducing means.

9. A reproducing apparatus according to claim 6, wherein said control means selects pictures to be outputted for ever predetermined number of pictures.

10. A reproducing apparatus according to claim 9, wherein said output means includes a memory, and said control means writes into said memory only the image data of the pictures selected.

11. A reproducing apparatus according to claim 9, wherein said control means selects a plurality of pictures adjacent to a picture that indicates a large motion from among the predetermined number of pictures.

12. A reproducing apparatus according to claim 9, wherein said control means selects pictures that indicate motions of values equal to or larger than a predetermined value from among the predetermined number of pictures.

13. A reproducing apparatus according to claim 6, wherein said control means selects pictures to be outputted, at predetermined intervals.

14. A reproducing apparatus according to claim 13, wherein said control means decides the predetermined intervals on the basis of the motion data.

15. A reproducing apparatus according to claim 6, wherein the image data is data coded by using motion information, and the motion data is obtained from the motion information.

16. A reproducing apparatus according to claim 6, wherein the image data is data coded with prediction at intervals of time, and the motion data is data indicative of motion between frames.

17. A reproducing apparatus comprising:

reproducing means for reproducing from a disk recording medium a data string including moving image data and motion data indicating motion of an image represented by said moving image data;

output means for outputting the moving image data reproduced by said reproducing means; and mode setting means for changing over a mode of said reproducing apparatus between a normal reproduction mode in which the moving image data are reproduced by said reproducing means from the disk recording medium at a normal reproduction speed and the moving image data of all pictures reproduced by said reproducing means is outputted by said output means, and a search reproduction mode in which the moving image data are reproduced by said reproducing means from the disk recording medium at a reproduction speed faster than the normal reproduction speed and, from among the moving image data of a plurality of pictures reproduced by said reproducing means, image data of pictures that are part of the plurality of pictures is selected and outputted on the basis of the motion data reproduced by said reproducing means.

18. A recording and reproducing apparatus comprising:

imaging means for picking up a moving image data;

recording means for recording, on a recording medium, the moving image data obtained by said imaging means and scene change information indicating a scene change of the moving image data;

reproducing means for reproducing, from the recording medium, the moving image data and the scene change data;

output means for outputting the moving image data reproduced by said reproducing means; and control means for controlling said output means to select, from among the image moving image data of a plurality of pictures reproduced by said reproducing means, image data of pictures that are part of the plurality of pictures, on the basis of the scene change data reproduced by said reproducing means and to output the selected image data.

* * * * *